United States Patent
Braley et al.

(10) Patent No.: US 12,422,529 B2
(45) Date of Patent: Sep. 23, 2025

(54) AUTO-EXPOSURE OCCLUSION CAMERA

(71) Applicant: Waymo LLC, Mountain View, CA (US)

(72) Inventors: Colin Braley, Mountain View, CA (US); Po-Chao Huang, Mountain View, CA (US); Chase Salsbury, San Mateo, CA (US); Hanna Revinskaya, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 826 days.

(21) Appl. No.: 17/454,885

(22) Filed: Nov. 15, 2021

(65) Prior Publication Data

US 2023/0152429 A1    May 18, 2023

(51) Int. Cl.
| | |
|---|---|
| *G01S 7/4863* | (2020.01) |
| *G01S 17/89* | (2020.01) |
| *G01S 17/931* | (2020.01) |
| *H04N 23/45* | (2023.01) |
| *H04N 23/73* | (2023.01) |

(52) U.S. Cl.
CPC ............ *G01S 7/4863* (2013.01); *G01S 17/89* (2013.01); *G01S 17/931* (2020.01); *H04N 23/45* (2023.01); *H04N 23/73* (2023.01)

(58) Field of Classification Search
CPC .............................................. G01S 2007/4975
See application file for complete search history.

(56) References Cited

U.S. PATENT DOCUMENTS

| | | |
|---|---|---|
| 10,013,616 B2 | 7/2018 | Gehrke |
| 10,269,141 B1 | 4/2019 | Shotan |
| (Continued) | | |

FOREIGN PATENT DOCUMENTS

| | | |
|---|---|---|
| CN | 209979845 | 1/2020 |
| CN | 112616028 | 4/2021 |
| (Continued) | | |

OTHER PUBLICATIONS

Hadj-Bachir et al., "Modelling of LIDAR sensor disturbances by solid airborne particles," SIA Simulation Numeriques, Digital event, France, Apr. 2021, 6 pages.

(Continued)

*Primary Examiner* — Thanh Luu
(74) *Attorney, Agent, or Firm* — McDonnell Boehnen Hulbert & Berghoff LLP

(57) ABSTRACT

An example method includes receiving, from a light detector, information indicative of a light intensity of a field of view of an optical system. The optical system includes one or more optical components and a light detector configured to receive light from a field of view of an environment of the optical system by way of the one or more optical components. The optical system also includes an occlusion-detection camera configured to capture images of the one or more optical components. The example method also includes adjusting, based on the received information, at least one operating parameter of the occlusion-detection camera. The example method also includes causing the occlusion-detection camera to capture at least one image of the one or more optical components according to the at least one adjusted operating parameter.

20 Claims, 8 Drawing Sheets

(56) References Cited

U.S. PATENT DOCUMENTS

| | | |
|---|---|---|
| 10,379,545 B2 | 8/2019 | Kennedy et al. |
| 10,502,618 B2 | 12/2019 | Droz et al. |
| 10,921,485 B2 | 2/2021 | Herman et al. |
| 11,100,616 B2 | 8/2021 | Herman et al. |
| 2015/0334385 A1* | 11/2015 | Takemura ............ H04N 17/002 348/175 |
| 2017/0115235 A1 | 4/2017 | Ohlsson et al. |
| 2019/0243376 A1 | 8/2019 | Davis et al. |
| 2020/0162642 A1 | 5/2020 | Oniki |
| 2020/0213581 A1 | 7/2020 | Lu et al. |
| 2021/0041542 A1 | 2/2021 | Shepard et al. |
| 2021/0173056 A1 | 6/2021 | Tsuchimoto et al. |
| 2021/0199770 A1 | 7/2021 | Gassend et al. |
| 2021/0199801 A1 | 7/2021 | Karplus et al. |
| 2021/0201070 A1 | 7/2021 | Omari et al. |

FOREIGN PATENT DOCUMENTS

| | | |
|---|---|---|
| CN | 113016175 | 6/2021 |
| DE | 102015217049 | 3/2017 |
| DE | 102019209837 | 1/2021 |
| JP | 2005195566 A | 7/2005 |
| JP | 2007127595 A | 5/2007 |
| JP | 2008068701 A | 3/2008 |
| JP | 2010014494 A | 1/2010 |
| JP | 2013115625 A | 6/2013 |
| JP | 2014235079 A | 12/2014 |
| JP | 2021139798 A | 9/2021 |
| WO | 2015045504 A1 | 4/2015 |
| WO | 2020/147116 | 7/2020 |
| WO | 2020170680 A1 | 8/2020 |
| WO | 2021/025850 | 2/2021 |

OTHER PUBLICATIONS

Mehta et al., "Gradient-based Auto-exposure Control Applied to a Self-Driving Car," University of Toronto, 2021, 1 page.

European Patent Office, Extended European Search Report mailed on Mar. 20, 2023, issued in connection with European Patent Application No. 22207443.7, 8 pages.

* cited by examiner

AUTO-EXPOSURE OCCLUSION CAMERA

BACKGROUND

Optical systems such as lidar devices and/or cameras may be used to sense a surrounding environment. For example, a lidar device may be used to generate a point cloud associated with an environment surrounding an autonomous vehicle, and that point cloud may be used by the autonomous vehicle for object detection and avoidance. Such lidar devices and/or cameras may include one or more optical components with which incident light may interact. For example, a lidar device and/or a camera may include an optical window, a mirror, a lens, etc.

In conventional optical systems, imperfections in the one or more optical components may affect the performance of the optical system. For example, in a lidar context, an occlusion or a scratch in an optical component of the lidar may adversely affect ranging and localization of objects in an environment. In such scenarios, fouled or degraded optical components may render the lidar system ineffective and/or cause the lidar system to provide incorrect or inaccurate information about the environment.

Conventional approaches may include a defect camera configured to capture images of the optical components in an effort to detect potential imperfections. However, such conventional approaches may be ineffective in scenes with very bright or very dim illumination. For example, the defect camera may capture high quality images under normal illumination conditions. However, under very bright conditions, the images from the defect camera may appear overexposed or "blown out" and under very low conditions, the images from the defect camera may appear dark and/or underexposed. Accordingly, improved systems and methods that may help more effectively identify and mitigate optical imperfections in optical systems, under various environmental background conditions, are desired.

SUMMARY

The present disclosure relates to optical systems, lidars, and methods of their use that may be configured to determine imperfections associated with one or more optical components under background scenarios having wide variations in illumination light. In some examples, embodiments may include detection and characterization of optical imperfections in systems and lidars configured to be utilized with self-driving vehicles.

In a first aspect, an optical system is provided. The optical system includes one or more optical components and a light detector configured to receive light from a field of view of an environment by way of the one or more optical components. The optical system also includes an occlusion-detection camera configured to capture images of the one or more optical components. Yet further, the optical system includes a controller having at least one processor and a memory. The at least one processor executes instructions stored in the memory so as to perform operations. The operations include receiving information indicative of a light intensity of the field of view and adjusting, based on the received information, at least one operating parameter of the occlusion-detection camera. The operations also include causing the occlusion-detection camera to capture at least one image of the one or more optical components according to the at least one adjusted operating parameter.

In a second aspect, an optical system is provided. The optical system includes one or more optical components and a light emitter device configured to emit emission light toward a field of view of an environment by way of the one or more optical components. The optical system also includes a light detector configured to receive light from a field of view of the environment by way of the one or more optical components. At least a portion of the received light includes reflected light. The reflected light includes at least a portion of the emission light that has reflected back toward the optical system after interaction with the environment. The optical system also includes an occlusion-detection camera configured to capture images of the one or more optical components. The optical system further includes a controller having at least one processor and a memory. The at least one processor executes instructions stored in the memory so as to perform operations. The operations include receiving information indicative of a light intensity of the field of view and adjusting, based on the received information, at least one operating parameter of the occlusion-detection camera. The operations also include causing the occlusion-detection camera to capture at least one image of the one or more optical components according to the at least one adjusted operating parameter. The operations yet further include determining, based on the reflected light, one or more objects in the environment.

In a third aspect, a method is provided. The method includes receiving, from a light detector, information indicative of a light intensity of a field of view of an optical system. The optical system includes one or more optical components and a light detector configured to receive light from a field of view of an environment by way of the one or more optical components. The optical system also includes an occlusion-detection camera configured to capture images of the one or more optical components. The method also includes adjusting, based on the received information, at least one operating parameter of the occlusion-detection camera. The method also includes causing the occlusion-detection camera to capture at least one image of the one or more optical components according to the at least one adjusted operating parameter.

Other aspects, embodiments, and implementations will become apparent to those of ordinary skill in the art by reading the following detailed description, with reference where appropriate to the accompanying drawings.

DETAILED DESCRIPTION

Figure 1:
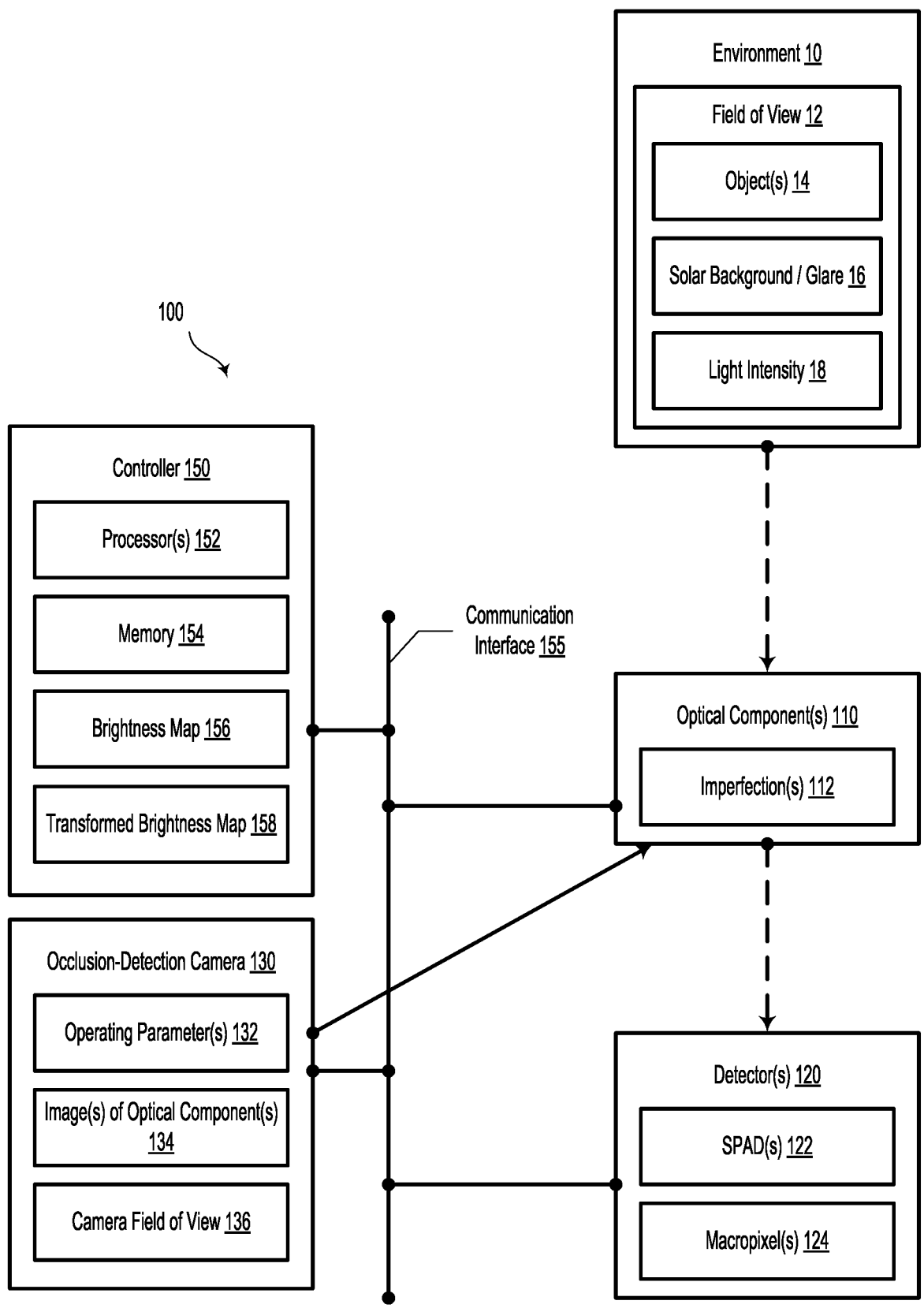
FIG. 1 illustrates an optical system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

In various scenarios, as a result of one or more imperfections of optical components within a camera or a lidar device, aberrations within captured images/generated point clouds can result. For example, a scratch, a crack, a smudge, a deformation, debris, an air bubble, an impurity, a degradation, a discoloration, an opacity, a warp, or condensation, etc. may cause light from a scene to be directed to unintended/improper regions of an image sensor/light detector, may prevent light from a scene from ever reaching an image sensor/light detector, or may otherwise modify light from a scene (e.g., modify polarization or wavelength) prior to the light reaching an image sensor/light detector. Such issues can result in improper object identification/distance detection. In autonomous vehicle applications, improper object identification/distance detection can adversely affect the operation of the vehicle.

In some embodiments, imperfections could include debris such as dust, soil, mud, insects, or other types of organic or inorganic matter that may collect along an optical surface of the lidar system. Additionally or alternatively, the imperfections could include water droplets and/or condensation.

To detect such imperfections (and possibly thereafter take a remedial action), the devices disclosed herein may include an additional camera (an "occlusion-detection camera") used to capture images of one or more of the optical components of the lidar device/camera being used to sense the surrounding environment. In some examples, the occlusion-detection camera could include a digital image sensor configured to detect incoming light intensity. In an example embodiment, such an image sensor could include a charge-coupled device (CCD) sensor, a complementary metal oxide semiconductor (CMOS) sensor, and/or a back-side illuminated CMOS (BSI-CMOS) sensor. It will be understood that other types of photodetectors are possible and contemplated.

Images captured by the occlusion-detection camera may be analyzed to determine whether one or more imperfections are present on a given optical component, the location of one or more imperfections on a given optical component, the size of one or more imperfections on a given optical component, and/or the type of one or more imperfections on a given optical component. Further, the occlusion-detection camera may be positioned adjacent to one or more detectors associated with the lidar device/camera that is being used to collect data about the surrounding environment.

However, images captured by the occlusion-detection camera may be susceptible to and/or adversely affected by background light (e.g., glare). For example, if the sun is present in an image captured by the occlusion-detection camera, it may be difficult to use that image to detect imperfections associated with an optical component. This is especially true when the occlusion-detection camera has a low dynamic range (e.g., low relative to the dynamic range of intensities present in the surrounding scene).

Embodiments described herein attempt to mitigate the effect of background light on the images captured by the occlusion-detection camera by adjusting exposure settings of the occlusion-detection camera based on data collected by the associated lidar device/camera. For example, the associated lidar device (e.g., which may have a higher dynamic range than the occlusion-detection camera) may collect intensity information from the surrounding scene. Other types of image sensors or photodetectors could be used to determine the intensity information from the scene. As an example, the other image sensors or photodetectors could be mounted internal or external from the camera or lidar device. The determined intensity information may indicate the brightness of the surrounding scene (e.g., the brightness of the solar background in the surrounding scene). Then, one or more of the exposure settings (e.g., exposure time, aperture size, and/or a gain setting of the image sensor) of the occlusion-detection camera may be modified (e.g., by an associated computing device) based on the brightness of the surrounding scene. By modifying the exposure settings, the effects of bright objects in the surrounding scene (e.g., the sun) may be minimized. Using the intensity information collected by the lidar device/camera may include generating a brightness map based on a field of view of the lidar device/camera and then transforming the brightness map based on the associated field of view of the occlusion-detection camera, as the fields of view of the lidar device/camera and the occlusion-detection camera are unlikely to be the same fields of view (e.g., as the occlusion-detection camera may only capture images of optical components of the lidar device/camera rather than an entire surrounding scene). The brightness map could include a two- or three-dimensional representation of received light intensity from the scene. The brightness map could include information indicative of, for example, bright objects (e.g., retroreflectors) in the scene. Transforming the brightness map based on the field of view of the occlusion-detection camera could include applying an affine transformation or another type of image transformation technique to reconcile the different fields of view of the occlusion-detection camera and the lidar device/camera.

FIG. 1 illustrates an optical system 100, according to an example embodiment. Some or all elements of optical system 100 could be physically coupled together. Additionally or alternatively, some elements of optical system 100 could be located remote from one another. Some or all elements of optical system 100 could be communicatively coupled via a communication interface 155. The communication interface 155 could include a wired and/or wireless communication link.

The optical system 100 includes one or more optical components 110. In some examples, the one or more optical components 110 could include at least one of: an optical window, a mirror, a lens, or a waveguide. As an example, the optical components 110 could include optical elements that may interact with (e.g., transmit, guide, block, focus, defocus, reflect, attenuate, etc.) incident light.

The optical system 100 also includes one or more light detectors 120 configured to receive light from a field of view 12 of an environment 10 of the optical system 100 by way of the one or more optical components 110. In some scenarios, at least some of the incident light could include a portion of solar background and/or glare light 16. Additionally or alternatively, some of the incident light may be indicative of various objects 14 (e.g., pedestrians, vehicles, signs, buildings, roads, etc.) in the environment 10. The environment 10 is further described elsewhere herein.

The optical system 100 additionally includes an occlusion-detection camera 130 configured to capture images of the one or more optical components 110. In various embodiments, the occlusion-detection camera 130 could include a charge-coupled device (CCD) image sensor. Additionally or alternatively, the occlusion-detection camera 130 could include an active-pixel sensor (e.g., a complementary metal-oxide semiconductor (CMOS) sensor). The occlusion-detection camera 130 could include one or more amplifiers configured to modify a gain characteristic of the image sensor. Overall, the total amount of incident light to the system could be determined to have a light intensity 18. In such scenarios, various operating characteristics of the occlusion-detection camera 130 could be adjusted based on the light intensity 18.

The optical system 100 also includes a controller 150. In an example embodiment, the controller 150 includes at least one processor 152 and a memory 154. In some embodiments, the controller 150 could include an application specific integrated circuit (ASIC), a field-programmable gate array (FPGA), a microprocessor, or a graphics processing unit (GPU). Other types of circuits and computing devices are possible and contemplated. The at least one processor 152 executes instructions stored in the memory 154 so as to perform operations. The operations include receiving information indicative of a light intensity 18 of the field of view 12. As an example, receiving information indicative of the light intensity 18 could include a signal from the detector(s) 120 that is based on (e.g., proportional to) the light intensity 18.

The operations additionally include adjusting, based on the received information, at least one operating parameter 132 of the occlusion-detection camera 130. Adjustable operating parameters 132 could include, for example, a camera exposure value (EV), a shutter speed, an f-number (e.g., ratio of the optical system's focal length to the diameter of the clear aperture), image sensor gain, image sensor exposure index (EI) and/or image sensor ISO. It will be understood that adjusting other types of operating parameters in an effort to controllably and dynamically change the exposure of the occlusion-detection camera 130 is possible and contemplated.

The operations further include causing the occlusion-detection camera 130 to capture at least one image 134 of the one or more optical components 110 according to the at least one adjusted operating parameter 132.

In some examples, the operations may further include determining, based on the at least one image 134, a presence of at least one imperfection 112 associated with the one or more optical components 110.

In various example embodiments, the operations could further include determining, based on the at least one image 134, a location of at least one imperfection 112 associated with the one or more optical components 110. Additionally or alternatively, the operations may further include determining, based on the at least one image 134, a size of at least one imperfection 112 associated with the one or more optical components 110. In some examples, the operations could include determining, based on the at least one image 134, a type of at least one imperfection 112 associated with the one or more optical components 110.

In various examples, the type of the at least one imperfection 112 could include at least one of: a scratch, a crack, a smudge, a deformation, an occlusion, debris, an air bubble, an impurity, a degradation, a discoloration, an imperfect transparency, a warp, or condensation. It will be understood that other types of optical imperfections are possible and contemplated.

In example embodiments, the occlusion-detection camera 130 could have a low-dynamic range relative to a range of light intensities 18 present in the field of view 12 (e.g., ½, 1/10, 1/100, 1/1000, 1/10000, or less dynamic range compared to the dynamic range of light present in the scene).

In some embodiments, adjusting, based on the received information, at least one operating parameter 132 of the occlusion-detection camera 130 includes adjusting at least one exposure setting of the occlusion-detection camera 130. In such scenarios, the at least one exposure setting could include an exposure time, an aperture size, a gain setting, or a sensitivity.

Various examples may include that the operations also include determining, based on the received information, a brightness map 156 associated with the field of view 12. In such scenarios, the operations may also include transforming the brightness map 156 based on a camera field of view 136 of the occlusion-detection camera 130 to provide a transformed brightness map 158. Furthermore, the operations could include that adjusting the at least one operating parameter 132 of the occlusion-detection camera 130 could be further based on the transformed brightness map 158.

Figure 2:
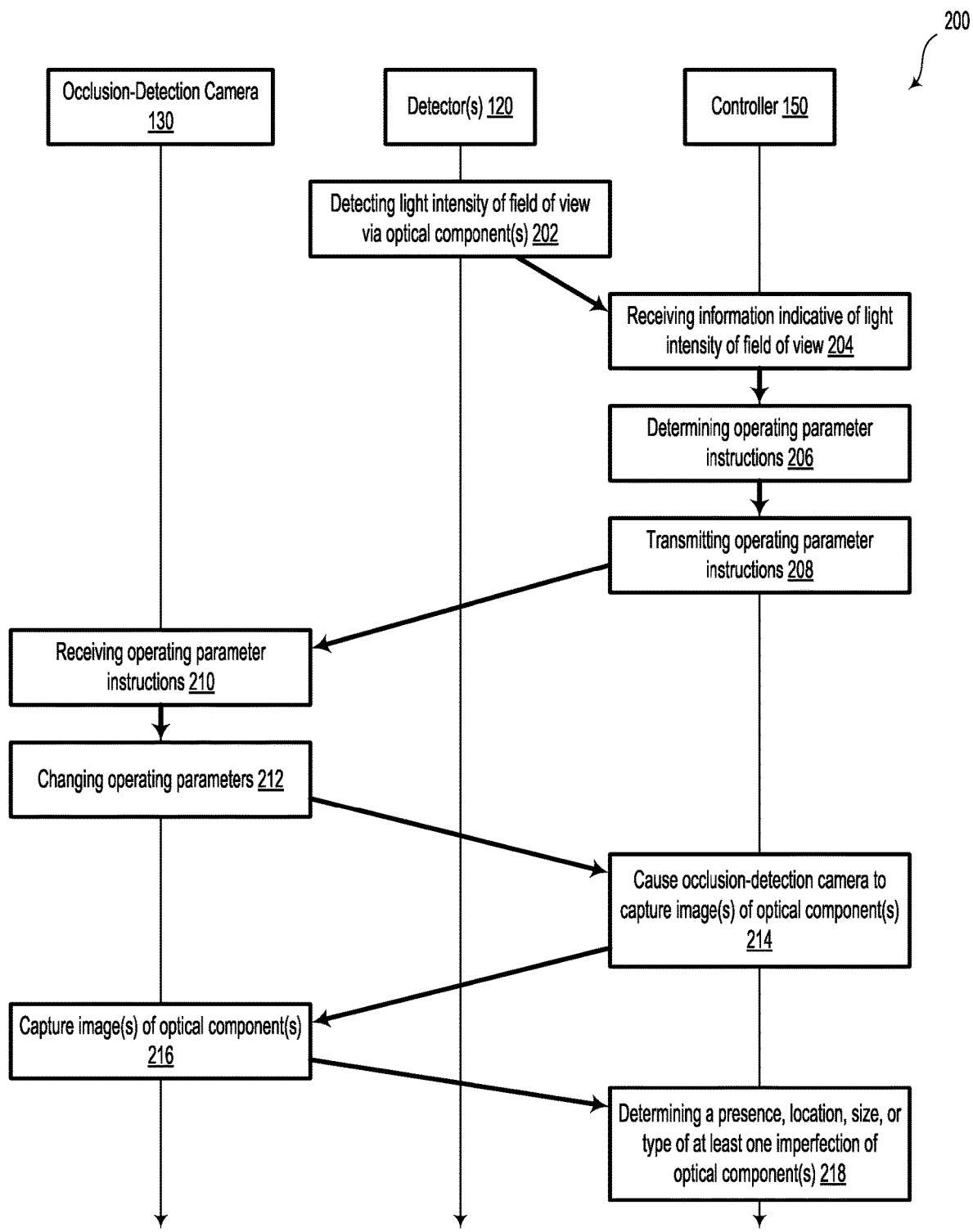
FIG. 2 illustrates a swimlane diagram, according to an example embodiment.

FIG. 2 illustrates a swimlane diagram 200, according to an example embodiment. The swimlane diagram 200 illustrates various blocks or steps that could be carried out by elements of optical system 100. For example, the swimlane diagram 200 includes blocks or steps that could be caused and/or carried out by the occlusion-detection camera 130, the detector(s) 120, and/or the controller 150.

In various examples, block 202 could include detector(s) (e.g., detector(s) 120) detect a light intensity (e.g., light intensity 18) of a field of view (e.g., field of view 12) via optical components (e.g., optical components 110). The detectors could include an image sensor of a camera and/or a detector of a lidar receiver module. It will understood that other types of detectors are possible and contemplated.

Block 204 includes receiving, at the controller 150, information indicative of the light intensity of the field of view. In such a scenario, the controller 150 could receive the information from the detectors via a wired or wireless communication link (e.g., communication interface 155).

Block 206 could include the controller 150 determining operating parameter instructions. In such a scenario, the controller 150 could calculate and/or utilize a look-up table to select a set of operating parameter instructions. The selected set of operating parameter instructions could be selected based on the detected light intensity so as to adjust the occlusion-detection camera 130 for proper imaging/exposure of the optical components 110.

Once the operating parameter instructions are determined, block 208 could include transmitting the instructions to the occlusion-detection camera 130. As an example, the instructions could be transmitted to the occlusion-detection camera 130 via the communication interface 155.

Block 210 includes the occlusion-detection camera 130 receiving the operating parameter instructions.

Block 212 includes the occlusion-detection camera 130 changing its operating parameters. In an example embodiment, the occlusion-detection camera 130 could adjust its aperture size, shutter time/exposure time, zoom setting, focus setting, detector gain, and/or ISO setting. Other adjustable parameters are possible and could be adjusted.

Block 214 includes the controller 150 causing the occlusion-detection camera 130 to capture images 134 of the optical components 110. In an example embodiment, the controller 150 could transmit instructions to the occlusion-detection camera 130 by way of the communication interface 155. In some examples, block 210 and 214 could be combined in a single instruction set from the controller 150. In other words, the operating parameters and imaging instructions could be transmitted by the controller 150 in the same message and/or message set. Other combinations of instructions are possible and contemplated within the scope of the present disclosure.

Block 216 includes the occlusion-detection camera 130 capturing one or more images 134 of the optical component(s) 110. As an example, the occlusion-detection camera 130 may capture a digital photograph of the optical component(s) 110. In some embodiments, the digital photographs may include light intensity information that could be encoded in the RGB color space and/or as raw data. In examples, the images 134 could be captured in various resolutions, including 1600 pixels×1200 pixels (1.92 megapixels), 2048 pixels×1536 pixels (3.1 megapixels), 3840 pixels×2160 pixels (4K UHDTV), or another digital image resolution.

It will be understood that the aspect ratio of the images 134 may be based, at least in part, on the physical format of the image sensor. For example, the occlusion-detection camera 130 could include an image sensor in an APS-C format, Micro Four Thirds format, Nikon CX format, ¼" format, among other possibilities.

Block 218 includes the controller 150 determining, based on the images 134, a presence, location, size, or type of at least one imperfection 112 associated with the optical component(s) 110. In some examples, the controller 150 could utilize various computer vision algorithms and/or processes in order to determine the various characteristics of the imperfection(s) 112. In some examples, the controller 150 could utilize artificial intelligence (e.g., a convolutional neural network) to perform various object recognition, identification, and/or detection tasks. It will be understood that other types of object recognition techniques could be implemented within the context of the present disclosure to determine information about the imperfection(s) 112.

In various embodiments, the controller 150 could compare a prior image (e.g., a reference image) with a current image 134. In such scenarios, the controller 150 could determine the presence, location, size, and/or type of the imperfection(s) 112 based on the comparison between the reference image and the current image 134.

Embodiments described herein may relate to a lidar system. An example lidar system may include a plurality of light-emitter devices configured to emit pulses of laser light into an environment. As an example, an environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. Additionally light pulses could be emitted into a local environment of the lidar system itself. For example, the light pulses could interact with a housing of the lidar system and/or surfaces or structures coupled to the lidar system. In some cases, the lidar system could be mounted to a vehicle. In such scenarios, the lidar system could be configured to emit light pulses that interact with objects within a vicinity of the vehicle.

The lidar system may additionally include a firing circuit configured to selectively control the plurality of light-emitter devices to emit the light pulses in accordance with one or more adjustable light-emission parameters. The lidar system also includes a plurality of detectors configured to receive return light generated by interactions between the emitted laser light pulses and the environment.

In specific embodiments, the lidar system could provide lidar functionality for a semi- or fully-autonomous vehicle. Such a vehicle can include motor vehicles (cars, trucks, buses, motorcycles, all-terrain vehicles, recreational vehicle, any specialized farming or construction vehicles, etc.), aircraft (planes, helicopters, drones, etc.), naval vehicles (ships, boats, yachts, submarines, etc.), or any other self-propelled vehicles (e.g., robots, factory or warehouse robotic vehicles, sidewalk delivery robotic vehicles, etc.) capable of being operated in a self-driving mode (without a human input or with a reduced human input) to navigate its environment. As described herein, the environment could include an interior or exterior environment, such as inside a building or outside of the building. Additionally or alternatively, the environment could include a vicinity around and/or on a roadway. Furthermore, the environment could include objects such as other vehicles, traffic signs, pedestrians, roadway surfaces, buildings, terrain, etc. Additionally or alternatively, the environment could include the interior of the semi- or fully-autonomous vehicle. In some embodiments, the lidar system could be configured to obtain point cloud information that could include information indicative of a plurality of points in specific locations in three-dimensional space. As an example, the point cloud information could indicate the location of objects in the environment.

Figure 3:
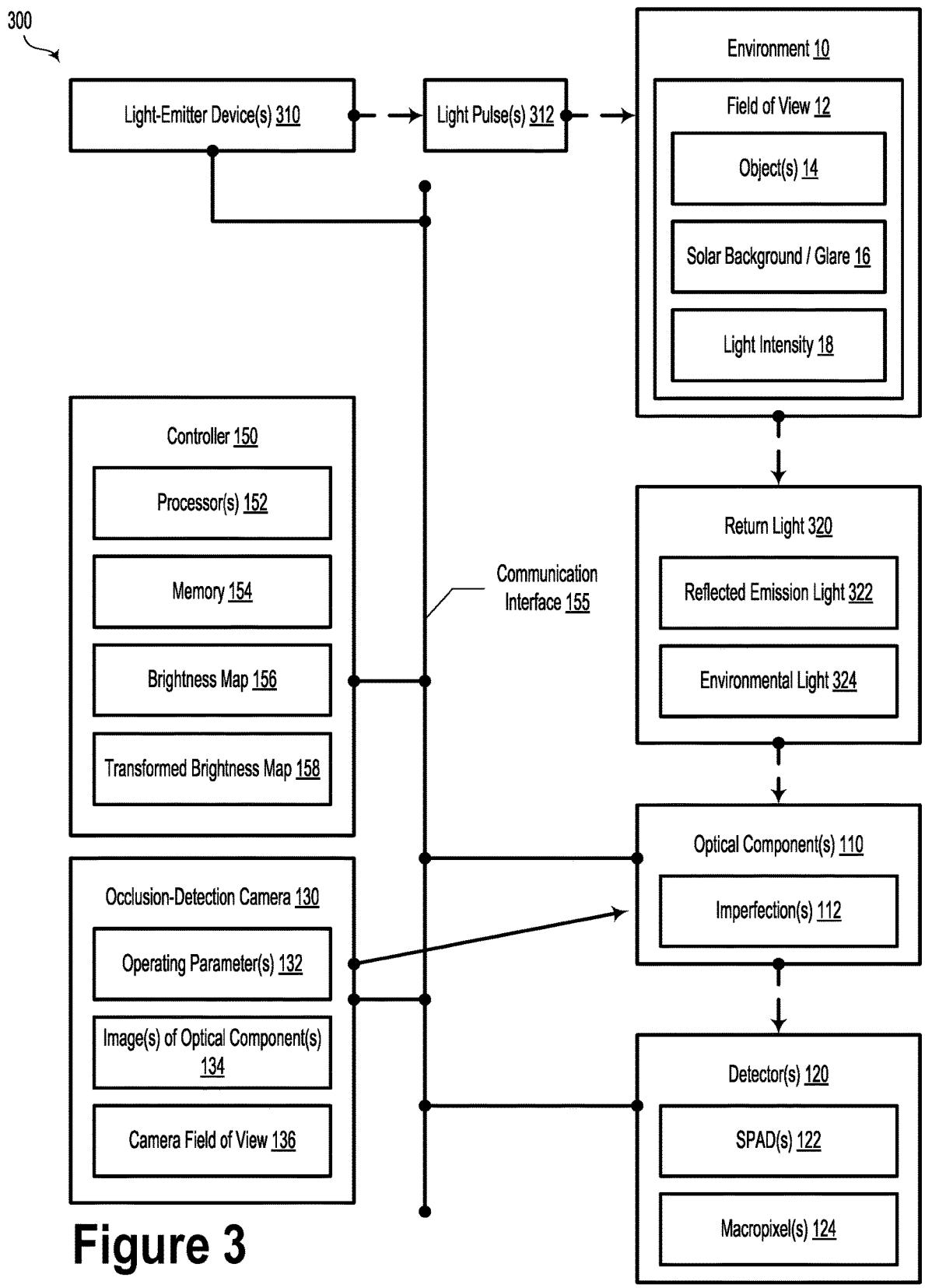
FIG. 3 illustrates a lidar, according to an example embodiment.

FIG. 3 illustrates a lidar 300, according to an example embodiment. Lidar 300 could include some or all of the elements of optical system 100. For example, lidar 300 may include optical components 110, detectors 120, an occlusion-detection camera 130 and a controller 150. Lidar 300 may additionally include one or more light-emitter devices 310, which may be configured to emit light pulses 312 into the environment 10 of the lidar 300. The light-emitter devices 310 could include one or more laser diodes (e.g., semiconductor laser bars), light-emitting diodes (LEDs), vertical-external-cavity surface-emitting-lasers (VECSELs), vertical-cavity surface-emitting lasers (VCSELs), or other types of devices configured to emit light in discrete light pulses. In an example embodiment, the light pulses could be emitted in an adjustable and/or controllable manner. However, other types of light-emitter devices are possible and contemplated. In some embodiments, the light-emitter devices 310 could be configured to emit light with wavelength around 905 nm. It will be understood that other emission wavelengths are possible and contemplated.

At least some of the light pulses 312 emitted by the light-emitter devices 310 may interact with objects 14 in the field of view 12 and some portion of those light pulses 312 may be reflected back toward the lidar 300 in the form of reflected emission light 322, which could be incident upon the optical components 110. Additionally, environmental light 324 from the environment 10 could be incident upon the optical components 110.

In such scenarios, the detectors 120 could be configured to receive the reflected emission light 322 and the environmental light 324. As described with respect to optical system 100, the detectors 120 could be configured to provide controller 150 with information indicative of the light intensity 18 of the environment 10. In response, the controller 150 could determine, based on the received information, various operating parameters 132 for the occlusion-detection camera 130. In such scenarios, the operating parameters 132 of the occlusion-detection camera 130 could be adjusted so as to provide a well-exposed image of the optical components 110 under the given solar background/glare conditions 16.

Figure 4:
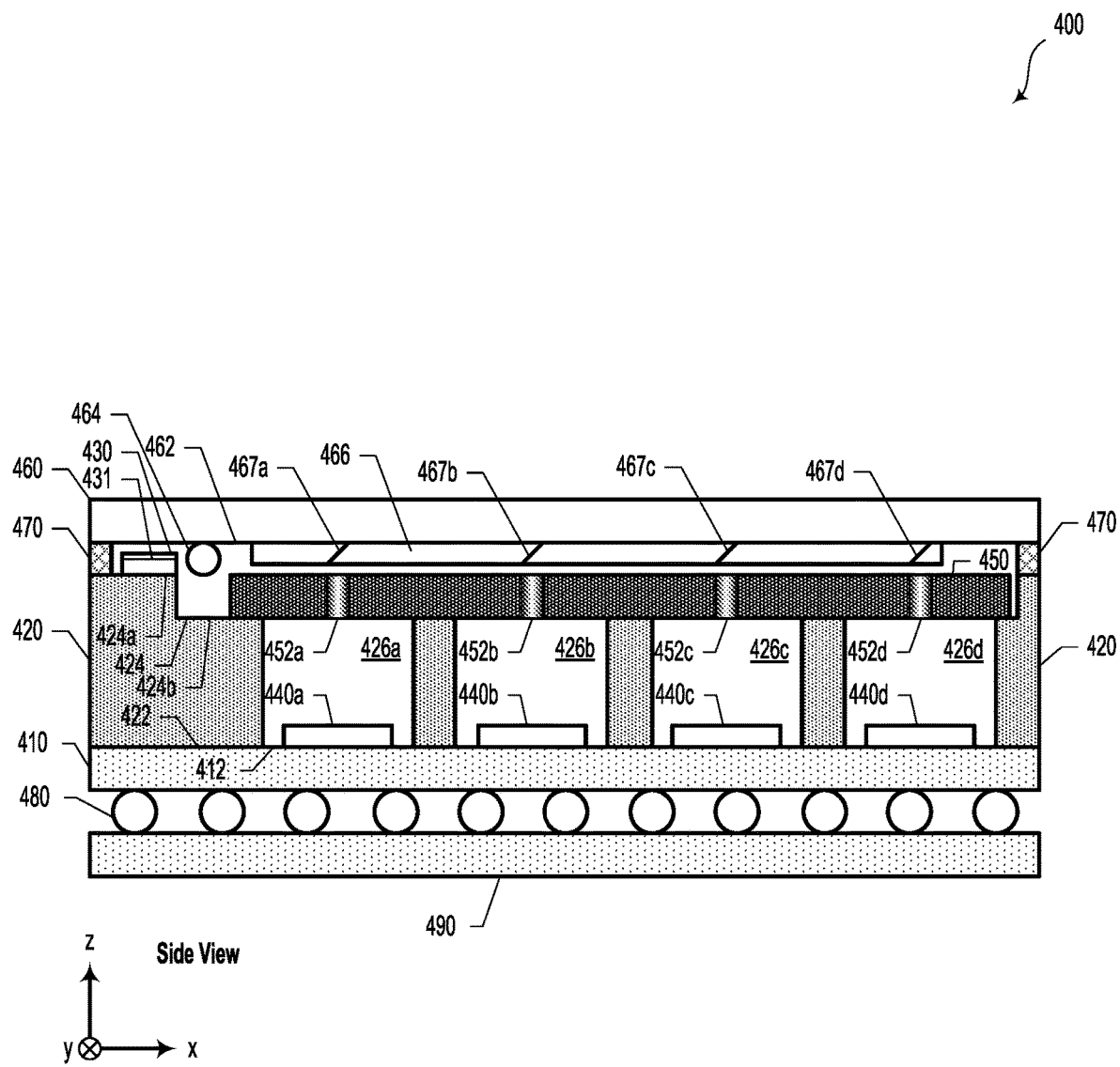
FIG. 4 illustrates a lidar, according to an example embodiment.
Figure 5A:
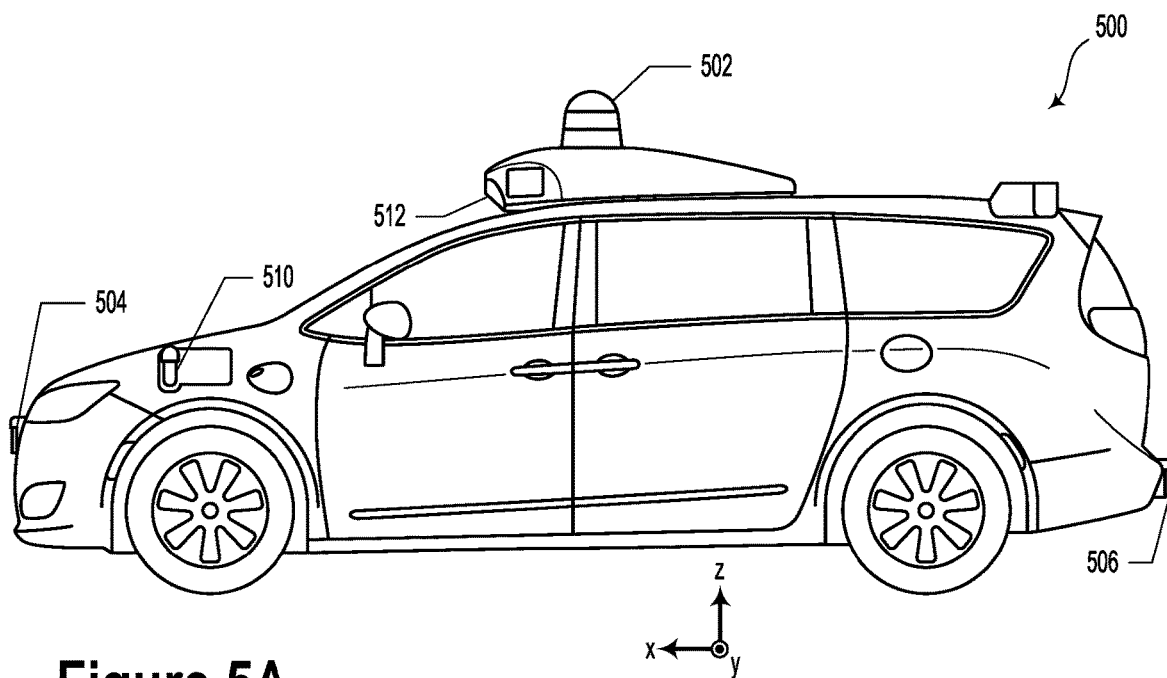
FIG. 5A illustrates a vehicle, according to an example embodiment.
Figure 5B:
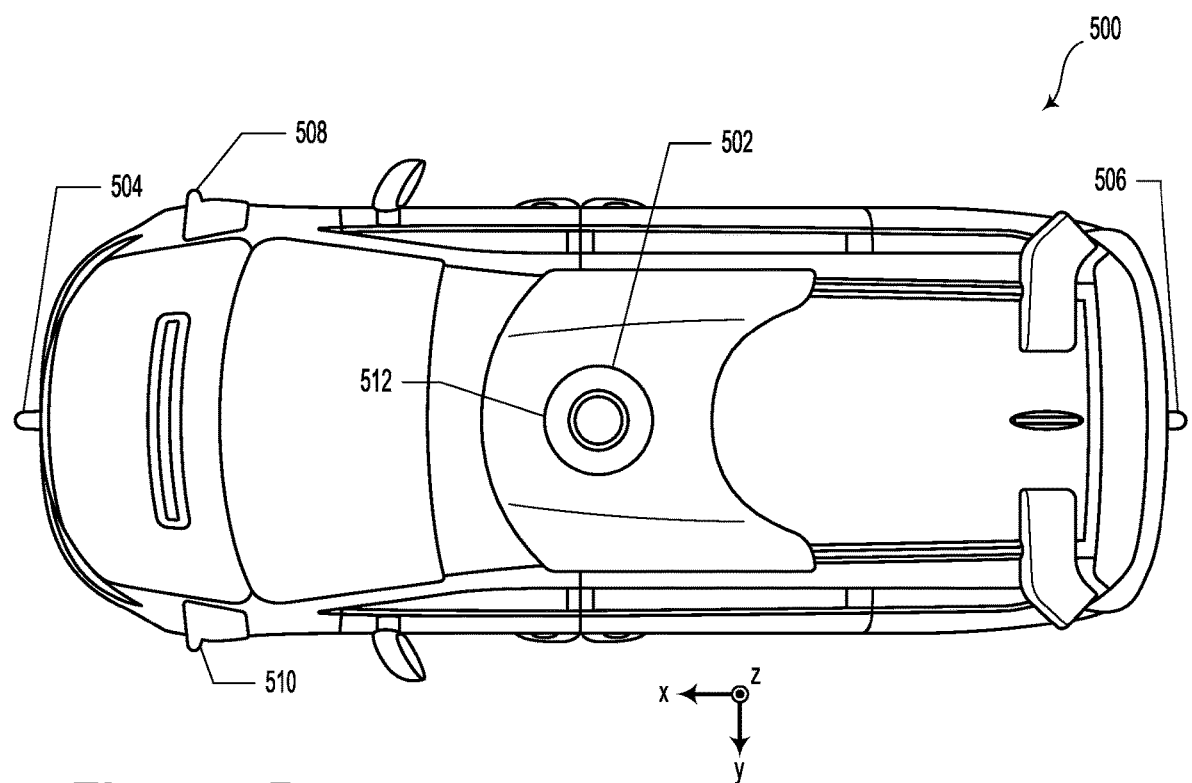
FIG. 5B illustrates a vehicle, according to an example embodiment.
Figure 5C:
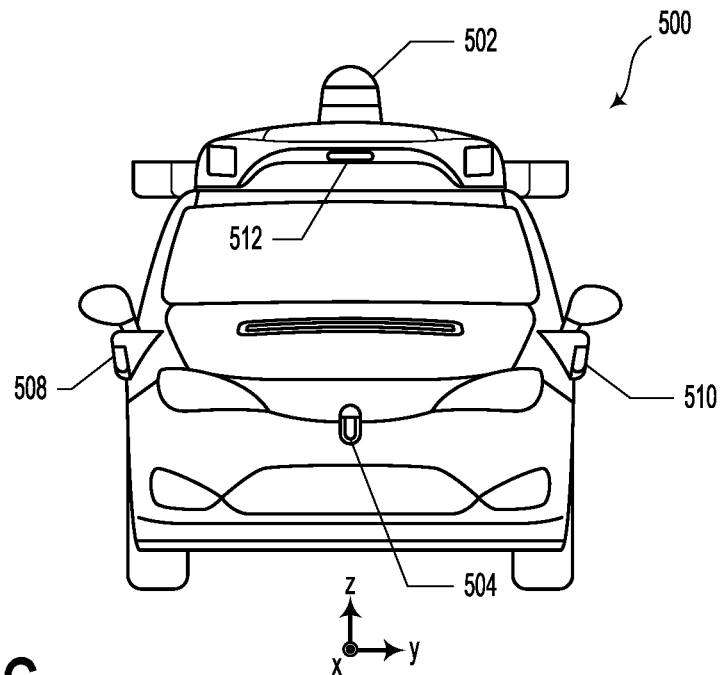
FIG. 5C illustrates a vehicle, according to an example embodiment.
Figure 5D:
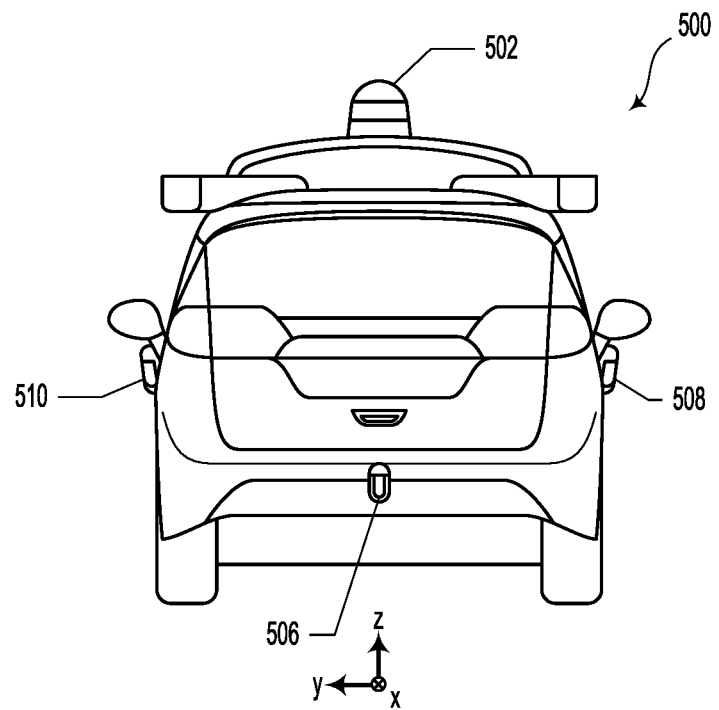
FIG. 5D illustrates a vehicle, according to an example embodiment.
Figure 5E:
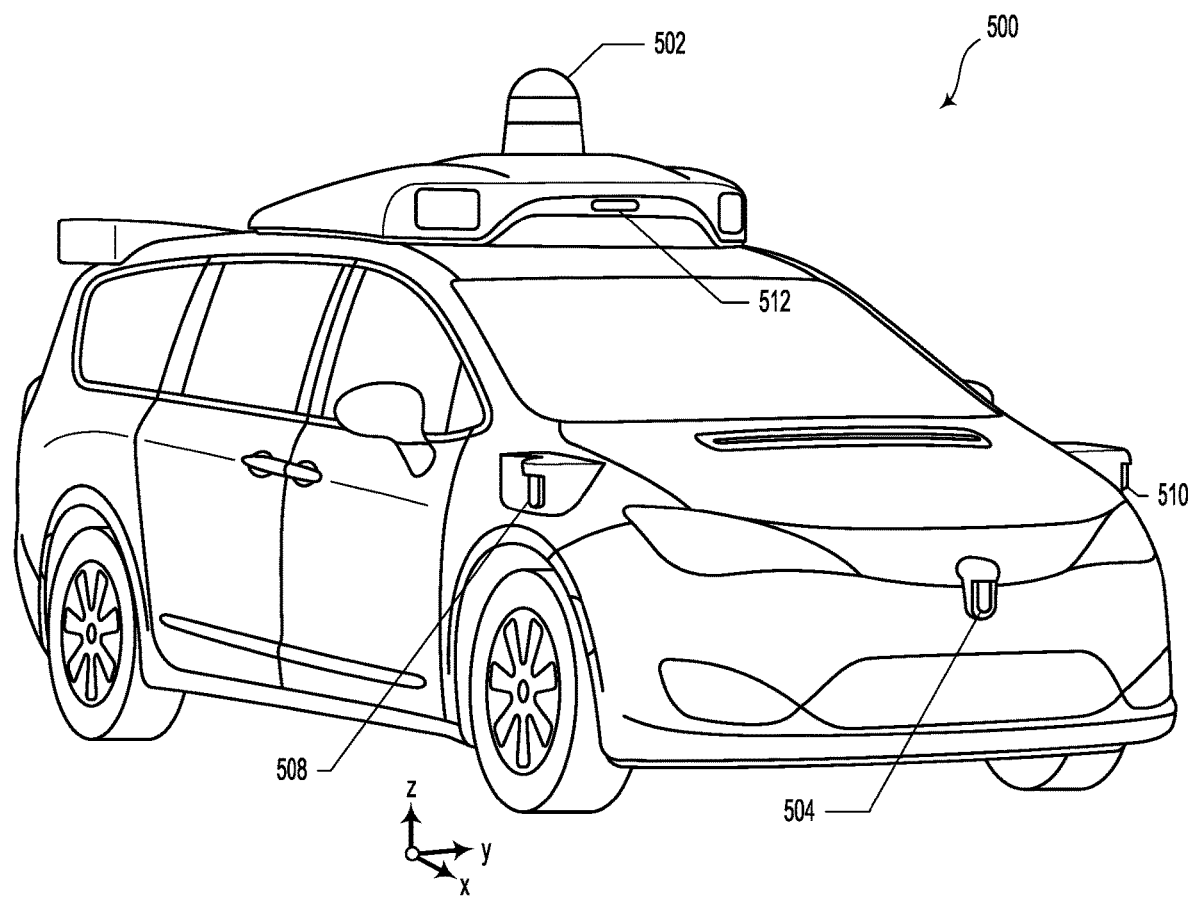
FIG. 5E illustrates a vehicle, according to an example embodiment.

FIG. 4 illustrates a cross-sectional view of a lidar 400, according to an example embodiment. FIG. 4 could include elements that are similar or identical to those of optical system 100 and lidar 300 illustrated and described in reference to FIGS. 1 and 3.

For example, in some embodiments, the lidar 400 could include a first substrate 410 having a mounting surface 412. In some embodiments, the first substrate 410 could be a printed circuit board (PCB). In some other embodiments, the first substrate 410 could include a semiconductor substrate material such as silicon, gallium arsenide, or the like. In some embodiments, the first substrate 410 could include a silicon-on-insulator (SOI) material. Alternatively, the first substrate 410 could be formed from a variety of other solid and/or flexible materials, each of which is contemplated in the present disclosure. The lidar 400 could include a spacer structure 420 having a first surface 422 and a second surface 424. The spacer structure 420 could include one or more cavities 426a-426d. The spacer structure 420 could include a semiconductor material and/or a polymeric material. Subsequently, using one or more techniques, at least one cavity (e.g., cavities 426a-426d) could be formed in the spacer structure 420. That is, a first surface 422 of the spacer structure 420 could have an opening forming part of the at least one cavity and a second surface 424 of the spacer structure 420 could have an opening forming part of the at least one cavity. In some embodiments, the cavities 426a-426d could be formed by removing at least a portion of the spacer structure 420 using semiconductor manufacturing methods such as dry or wet etching processes. Other ways to form the cavities in the spacer structure 420 are contemplated.

One or more light-emitter devices 430 could be coupled to the second surface 424 of the spacer structure 420. The light-emitter devices 430 could each include one or more light-emitting regions 431. The second surface 424 could include an upper surface 424a and a lower surface 424b. For example, the upper surface 424a could define a first plane and the lower surface 424b could define a second plane. That is, in some embodiments, the second surface 424 could include an upper surface 424a that "steps down" to a lower surface 424b.

In some embodiments, detector devices 440a-440d could be disposed within the one or more cavities 426a-426d. For example, as illustrated, each cavity could include one detector device. Alternatively, multiple detector devices and/or detector arrays could be disposed in a single cavity. The detector devices 440a-440d could be configured to detect the light emitted by the one or more light-emitter devices 430 after interaction with the external environment. In examples, the at least one detector devices 440a-440d could include a silicon photomultiplier (SiPM), an avalanche photodiode (APD), or another type of photodetector.

As additionally illustrated in FIG. 4, an intermediate lid 450 could be coupled to the second surface 424 (e.g., the lower surface 424b) of the spacer structure 420. In embodiments, the intermediate lid 450 could include a plurality of apertures 452a-452d, which could be disposed adjacent to the cavities 426a-426d. In some embodiments, the apertures 452a-452d could have a diameter of 150 microns. However, other aperture diameters are possible and contemplated.

In some embodiments, the plurality of apertures 452a-452d could include holes drilled or lithographically etched through a material that is substantially opaque to light emitted by the light-emitter devices 430. In other embodiments, the plurality of apertures 452a-452d could include optical windows that are substantially transparent to light emitted by the light-emitter devices 430.

While FIG. 4 illustrates the intermediate lid 450 as including the plurality of apertures 452a-452d, it will be understood that in some embodiments, the plurality of apertures 452a-452d could be formed in the spacer structure 420. For example, the spacer structure 420 could include one or more holes forming the plurality of apertures 452a-452d. In one example embodiment, plurality of apertures 452a-452d could be formed between the upper surface 424a and the lower surface 424b of the spacer structure 420.

FIG. 4 also illustrates a second substrate 460 that includes a mounting surface 462. In some embodiments, the second substrate 460 could be substantially transparent to light emitted by light-emitter device 430. At least one lens 464 could be coupled to the mounting surface 462 of the second substrate 460. The second substrate 460 could be formed from a transparent material, such as glass, plastic, fused silica, or another transparent low-refractive index material. A top surface of the second substrate 460 could include an antireflective coating. Optionally, an antireflective coating could be applied to the mounting surface 462 of the second substrate 460. Furthermore, at least one waveguide 466 is coupled to the mounting surface 462 of the second substrate 460. In embodiments, the at least one waveguide 166 could include reflective surfaces 467a-467d (e.g., mirrored facets).

For example, the at least one waveguide 466 could be configured to efficiently guide light along a propagation direction. For example, the at least one waveguide 466 may be configured to couple light emitted from the at least one light-emitter device 430. At least a portion of such light may be guided within at least a portion of the at least one waveguide 466 via total internal reflection and/or evanescent optical coupling.

In some embodiments, the at least one waveguide 466 includes at least one reflective surface. In such scenarios, at least a portion of the optically-coupled light could interact with the at least one reflective surface so as to be directed toward an external environment. For example, the at least one waveguide 466 may include one or more reflective surfaces (e.g., mirrored facets) configured to direct light normal to the propagation direction. In such a scenario, at least a portion of the light may be coupled out of the at least one waveguide 166 via a mirrored facet.

In examples, a shim 470 could be disposed between a second surface 424 of the spacer structure 420 and the mounting surface 462 of the second substrate 460. The shim 470 could be configured to prevent light from leaking through the edge of the lidar 400. In some embodiments, the shim 470 could include a polymer material that cures or molds around the second substrate 460. In such a scenario, the shim 470 could hold the second substrate 460 at a fixed height and/or location relative to the spacer structure 420 and other elements of the lidar 400. The spacer structure 120 could include a semiconductor material and/or a polymeric material. In some embodiments, the shim 470 could be selected such that a light-emitting region 431 is disposed at a predetermined or desired position with respect to the at least one lens 464 and/or the at least one waveguide 466. For example, the shim 470 could be selected so that light emitted from the light-emitting region 431 is efficiently collected by the at least one lens 464 and efficiently optically-coupled into the at least one waveguide 466.

While FIG. 4 illustrates shim 470 as being located near the sides of the lidar 400, it will be understood that the shim 470 could be located elsewhere. For example, shim 470 could be disposed between the intermediate lid 450 and the mounting surface 462 of the second substrate 460. Additionally or alternatively, shim 470 could be present in other regions of the lidar 400, for example, to provide a baffle (e.g., to prevent stray light).

The lidar 400 could additionally include a circuit board 490 that could be physically coupled to the first substrate 410 by way of controlled-collapse solder balls 480. Other ways to physically and/or electrically connect the first substrate 410 to the circuit board 490 are possible and contemplated, such as, without limitation, conventional solder balls, ball-grid arrays (BGA), land-grid arrays (LGA), conductive paste, and other types of physical and electrical sockets. It will be understood that while FIGS. 3 and 4 illustrate specific lidar embodiments, other types and arrangements of lidars and/or cameras are possible and contemplated.

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of semi- or fully-autonomous vehicle that is capable of being operated in a self-driving mode (without a human input or with a reduced human input) to navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could represent one or more optical systems 100 as illustrated and described in relation to FIG. 1 and/or one or more lidars 300 as illustrated and described in relation to FIG. 3. In other words, optical systems and lidar systems described elsewhere herein could be coupled to the vehicle 500 and/or could be utilized in conjunction with various operations of the vehicle 500. As an example, the lidar system 300 could be utilized in self-driving or other types of navigation, planning, perception, and/or mapping operations of the vehicle 500.

In some examples, the one or more optical systems and/or lidars could be disposed in various locations on the vehicle 500 and could have fields of view that correspond to an environment that is internal and/or external to the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate or pivot about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment of the vehicle 500 may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with multiple light-emitter devices (e.g., a light-emitter device with multiple laser bars on a single laser die) are described and illustrated herein, lidar systems with single light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

The lidar system of vehicle 500 further includes a plurality of detectors (e.g., detectors 120).

The lidar system of vehicle 500 additionally includes a controller (e.g., controller 150) having at least one processor (e.g., processor(s) 152) and a memory (e.g., memory 154). The at least one processor executes instructions stored in the memory so as to perform operations. The operations may include any of the method steps or blocks described with regard to method 600.

In some embodiments, the one or more sensor systems 502, 504, 506, 508, 510, and/or 512 could include image sensors. For example, vehicle 500 could include a camera that includes an image sensor configured to provide images of a field of view. In various examples, the image sensor may include a plurality of detector elements.

In such scenarios, the camera could be disposed within sensor system 502, 504, 506, 508, 510 and/or 512. The camera can be a photosensitive instrument, such as a still camera, a video camera, a thermal imaging camera, a stereo camera, a night vision camera, etc., that is configured to capture a plurality of images of the environment of the vehicle 500. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment of the vehicle 500. To this end, the camera may use one or more range detecting techniques. For example, the camera can provide range information by using a structured light technique in which the vehicle 500 illuminates an object in the environment of the vehicle 500 with a predetermined light pattern, such as a grid or checkerboard pattern and uses the camera to detect a reflection of the predetermined light pattern from environmental surroundings. Based on distortions in the reflected light pattern, the vehicle 500 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 500. Other mounting locations and viewing angles of the camera can also be used, either inside or outside the vehicle 500. Further, the camera can have associated optics operable to provide an adjustable field of view. Still further, the camera can be mounted to vehicle 500 with a movable mount to vary a pointing angle of the camera, such as via a pan/tilt mechanism.

Additionally or alternatively, the vehicle 500 and/or sensor system 502, 504, 506, 508, 510, and/or 512 could include one or more radar systems. The radar system(s) could be configured to emit radio waves to determine the range, angle, and/or relative velocity of objects within the environment of the vehicle 500. As an example, the radar system could include a transmitter configured to emit radio waves or micro waves and a receiver configured to receive information about how those radio waves or micro waves interact with the environment of the vehicle 500. In various embodiments, the radar system could be configured to operate in pulsed and/or continuous mode.

In some embodiments, the vehicle 500 and/or sensor systems 502, 504, 506, 508, 510, and/or 512 could include other types of sensors such as one or more range finders, one or more inertial sensors, one or more humidity sensors, one or more acoustic sensors (e.g., microphones, sonar devices, etc.), and/or one or more other sensors configured to sense information about the environment of the vehicle 500. Any sensor system described elsewhere herein could be coupled to the vehicle 500 and/or could be utilized in conjunction with various operations of the vehicle 500. As an example, a lidar system could be utilized in self-driving or other types of navigation, planning, perception, and/or mapping operations of the vehicle 500. Yet further, one or more sensor types could be utilized in combination with one another (e.g., lidar and radar, lidar and camera, camera and radar, etc.).

Although not shown in FIGS. 5A-5E, the vehicle 500 can include a wireless communication system. The wireless communication system may include wireless transmitters and receivers that could be configured to communicate with devices external or internal to the vehicle 500. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Figure 6:
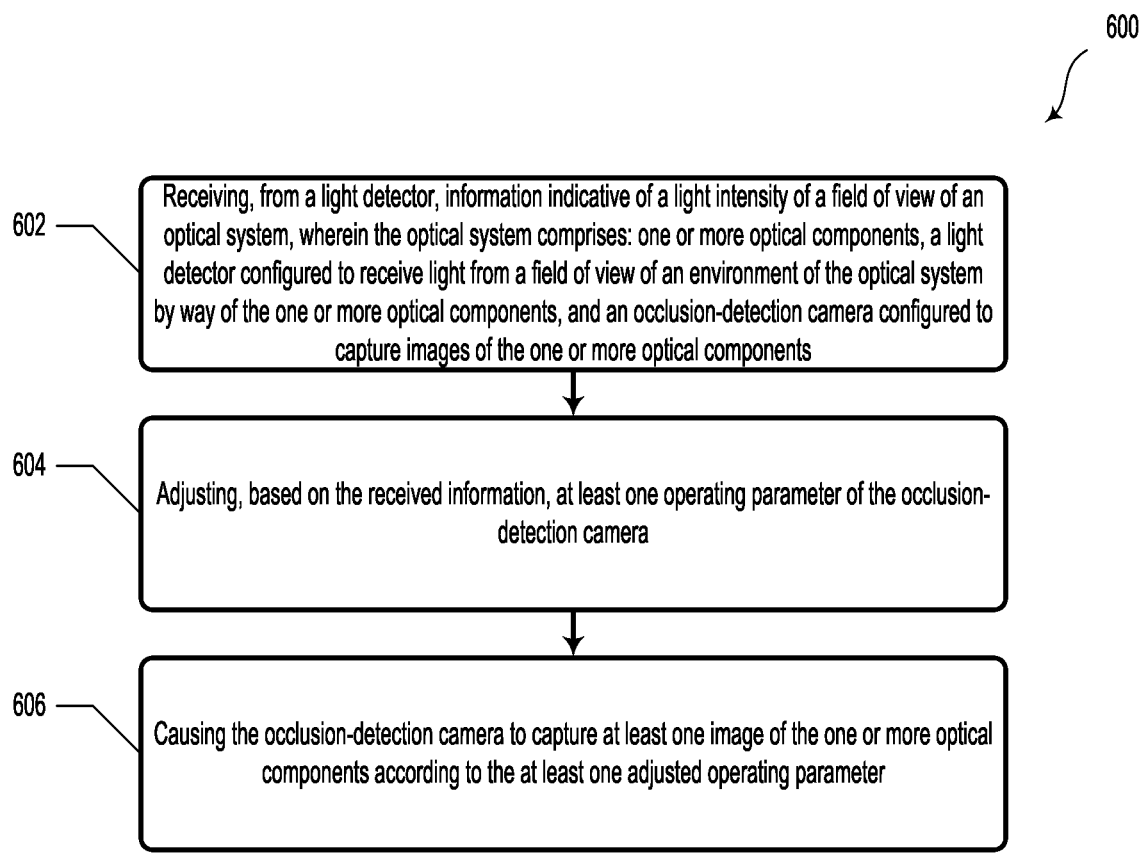
FIG. 6 illustrates a method, according to an example embodiment.

FIG. 6 illustrates a method, according to an example embodiment. While method 600 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out so as to operate the optical system 100, lidar 300, and/or vehicle 500, as illustrated and described in reference to FIG. 1, FIG. 3, and FIG. 5, respectively.

Block 602 includes receiving, from a light detector (e.g., light detector 120), information indicative of a light intensity (e.g., light intensity 18) of a field of view (e.g., field of view 12) of an optical system (e.g., optical system 100). In such scenarios, the optical system includes one or more optical components (e.g., optical component(s) 110) and a light detector (e.g., light detector 120) configured to receive light from a field of view of an environment (e.g., environment 10) of the optical system by way of the one or more optical components. The optical system also includes an occlusion-detection camera (e.g., occlusion-detection camera 130) configured to capture images of the one or more optical components.

Block 604 includes adjusting, based on the received information, at least one operating parameter (e.g., operating parameter 132) of the occlusion-detection camera.

Block 606 includes causing the occlusion-detection camera to capture at least one image (e.g., images 134) of the one or more optical components according to the at least one adjusted operating parameter.

In some examples, method 600 may include determining, based on the at least one image, at least one of: a presence, a location, a size, or a type of at least one imperfection (e.g., imperfection 112) associated with the one or more optical components. In such scenarios, the type of the at least one imperfection comprises at least one of: a scratch, a crack, a smudge, a deformation, an occlusion, debris, an air bubble, an impurity, a degradation, a discoloration, an opacity, a warp, or condensation. It will be understood that other types of optical imperfections and/or optical characteristics are possible and contemplated within the scope of the present disclosure.

In some embodiments, adjusting, based on the received information, at least one operating parameter of the occlusion-detection camera could include adjusting at least one exposure setting of the occlusion-detection camera. As an example, the at least one exposure setting could include an exposure time, an aperture size, a gain setting, or a sensitivity.

In various embodiments, the method 600 may also include determining, based on the received information, a brightness map (e.g., brightness map 156) associated with the field of view.

In such scenarios, the method 600 may additionally include transforming the brightness map based on a field of view of the occlusion-detection camera to provide a transformed brightness map. Furthermore, the method 600 may include that adjusting the at least one operating parameter of the occlusion-detection camera is further based on the transformed brightness map.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   one or more optical components;
   a light detector configured to receive light from a field of view of an environment by way of the one or more optical components;
   an occlusion-detection camera configured to capture images of the one or more optical components; and
   a controller comprising at least one processor and a memory, wherein the at least one processor executes instructions stored in the memory so as to perform operations, the operations comprising:
      receiving information indicative of a light intensity of the field of view;
      adjusting, based on the received information, at least one operating parameter of the occlusion-detection camera; and
      causing the occlusion-detection camera to capture at least one image of the one or more optical components according to the at least one adjusted operating parameter.

2. The optical system of claim 1, wherein the operations further comprise:
   determining, based on the at least one image, a presence of at least one imperfection associated with the one or more optical components.

3. The optical system of claim 1, wherein the operations further comprise:
   determining, based on the at least one image, a location of at least one imperfection associated with the one or more optical components.

4. The optical system of claim 1, wherein the operations further comprise:
   determining, based on the at least one image, a size of at least one imperfection associated with the one or more optical components.

5. The optical system of claim 1, wherein the operations further comprise:
   determining, based on the at least one image, a type of at least one imperfection associated with the one or more optical components.

6. The optical system of claim 5, wherein the type of the at least one imperfection comprises at least one of: a scratch, a crack, a smudge, a deformation, an occlusion, debris, an air bubble, an impurity, a degradation, a discoloration, an imperfect transparency, a warp, or condensation.

7. The optical system of claim 1, wherein the occlusion-detection camera has a low-dynamic range relative to a range of light intensities present in the field of view.

8. The optical system of claim 1, wherein adjusting, based on the received information, at least one operating parameter of the occlusion-detection camera comprises adjusting at least one exposure setting of the occlusion-detection camera, wherein the at least one exposure setting comprises: an exposure time, an aperture size, a gain setting, or a sensitivity.

9. The optical system of claim 1, wherein the operations further comprise:
   determining, based on the received information, a brightness map associated with the field of view.

10. The optical system of claim 9, wherein the operations further comprise:
    transforming the brightness map based on a field of view of the occlusion-detection camera to provide a transformed brightness map.

11. The optical system of claim 10, wherein adjusting the at least one operating parameter of the occlusion-detection camera is further based on the transformed brightness map.

12. The optical system of claim 1, wherein the one or more optical components comprise at least one of: an optical window, a mirror, a lens, or a waveguide.

13. An optical system comprising:
    one or more optical components;
    a light emitter device configured to emit emission light toward a field of view of an environment by way of the one or more optical components;
    a light detector configured to receive light from a field of view of the environment by way of the one or more optical components, wherein at least a portion of the received light comprises reflected light, wherein the reflected light comprises at least a portion of the emission light that has reflected back after interaction with the environment;
    an occlusion-detection camera configured to capture images of the one or more optical components; and
    a controller comprising at least one processor and a memory, wherein the at least one processor executes instructions stored in the memory so as to perform operations, the operations comprising:
       receiving information indicative of a light intensity of the field of view;

adjusting, based on the received information, at least one operating parameter of the occlusion-detection camera;

causing the occlusion-detection camera to capture at least one image of the one or more optical components according to the at least one adjusted operating parameter; and determining, based on the reflected light, one or more objects in the environment.

14. A method comprising:

receiving, from a light detector, information indicative of a light intensity of a field of view of an optical system, wherein the optical system comprises:

one or more optical components;

a light detector configured to receive light from a field of view of an environment by way of the one or more optical components; and an occlusion-detection camera configured to capture images of the one or more optical components;

adjusting, based on the received information, at least one operating parameter of the occlusion-detection camera; and causing the occlusion-detection camera to capture at least one image of the one or more optical components according to the at least one adjusted operating parameter.

15. The method of claim 14, further comprising:

determining, based on the at least one image, at least one of: a presence, a location, a size, or a type of at least one imperfection associated with the one or more optical components.

16. The method of claim 15, wherein the type of the at least one imperfection comprises at least one of: a scratch, a crack, a smudge, a deformation, an occlusion, debris, an air bubble, an impurity, a degradation, a discoloration, an opacity, a warp, or condensation.

17. The method of claim 14, wherein adjusting, based on the received information, at least one operating parameter of the occlusion-detection camera comprises adjusting at least one exposure setting of the occlusion-detection camera, wherein the at least one exposure setting comprises: an exposure time, an aperture size, a gain setting, or a sensitivity.

18. The method of claim 14, further comprising:

determining, based on the received information, a brightness map associated with the field of view.

19. The method of claim 18, further comprising:

transforming the brightness map based on a field of view of the occlusion-detection camera to provide a transformed brightness map.

20. The method of claim 19, wherein adjusting the at least one operating parameter of the occlusion-detection camera is further based on the transformed brightness map.

* * * * *